(12) United States Patent
Oh et al.

(10) Patent No.: US 7,380,252 B2
(45) Date of Patent: May 27, 2008

(54) DISC DRIVE WITH RESONATOR

(75) Inventors: Suk-il Oh, Suwon-si (KR);
Myung-ryul Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 586 days.

(21) Appl. No.: 10/897,443

(22) Filed: Jul. 23, 2004

(65) Prior Publication Data

US 2005/0060728 A1    Mar. 17, 2005

(30) Foreign Application Priority Data

Jul. 24, 2003    (KR) ...................... 10-2003-0051130

(51) Int. Cl.
*G11B 33/14*    (2006.01)
(52) U.S. Cl. ..................................... 720/648; 720/692
(58) Field of Classification Search .................... None
See application file for complete search history.

(56) References Cited

U.S. PATENT DOCUMENTS 6,493,180 B1* 12/2002 Kang et al. ............... 360/97.02
2004/0205788 A1* 10/2004 Choi et al. .................. 720/611

FOREIGN PATENT DOCUMENTS

KR    2000-0010127    2/2000

* cited by examiner

*Primary Examiner*—Thang V. Tran
(74) *Attorney, Agent, or Firm*—Staas & Halsey LLP

(57) ABSTRACT

A disc drive includes a frame in which a spindle motor and an optical pickup are installed, and at least one helmholtz resonator that is installed in the frame to reduce noise of a particular frequency determined by a volume of a resonating tube and a length and diameter of a neck of the resonator, where the helmholtz resonator may be constructed to be united with the frame.

16 Claims, 4 Drawing Sheets

US 7,380,252 B2

DISC DRIVE WITH RESONATOR

CROSS-REFERENCE TO RELATED APPLICATION

This application claims the priority of Korean Patent Application No. 2003-51130, which was filed on Jul. 24, 2003 in the Korean Intellectual Property Office, the disclosure of which is incorporated herein in its entirety by reference.

BACKGROUND OF THE INVENTION

1. Field of the Invention

The present invention relates to a disc drive, and more particularly, to a disc drive capable of reducing noise generated by rotation of a disc.

2. Description of the Related Art

In general, a disc drive is an apparatus that writes data to or reads data on a rotating disc by using an optical pickup that slides in a radial direction of the disc. Rotation of the disc at a high speed leads to flow of air into the disc drive. The friction of air flow against a surface of the rotating disc, the pressure gradient around the disc, a collision of air flow against a disc tray, and the inside of the disc drive; and formation of a turbulence around the rotating disc, resulting in noise in the disc drive.

It is possible to reduce extent of noise in the disc drive by filing openings in the disc drive with a sound-absorbing material or a sound-insulating material so that noise generated in the disc drive cannot come out of the disc drive. However, although this method largely reduces extent of noise in the disc drive, the sound-absorbing material or the sound-insulating material may be easily separated from the openings of the disc drive during high-temperature aging of the disc drive.

SUMMARY OF THE INVENTION

Additional aspects and/or advantages of the invention will be set forth in part in the description which follows and, in part, will be obvious from the description, or may be learned by practice of the invention.

An aspect of the present invention provides a disc drive capable of removing a high sound pressure level (SPL) frequency noise.

According to an aspect of the present invention, there is provided an optical disc drive with an optical pickup that accesses a disc rotated by a spindle motor so as to write data to and/or read data from the disc, the disc drive comprising a frame in which the spindle motor and the optical pickup are installed; and at least one helmholtz resonator which is installed in the frame to reduce noise of a particular frequency determined by a volume of a resonating tube and a length and an equivalent diameter of a neck.

According to an aspect of the present invention, there is provided a computer, stand alone player (such as a Digital Versatile Disc player), or PDA (personal digital Assistant) having a disc drive with a pickup that accesses a disc rotated by a spindle motor so as to write data to and/or reads data from the disc, the disc drive comprising a frame in which the spindle motor and the pickup are installed; and at least one helmholtz resonator which is installed in the frame to reduce noise of a particular frequency determined by a volume of a resonating tube and a length and an equivalent diameter of a neck According to aspects of the invention helmholtz resonator may be constructed integrally with the frame, and the frame may include a main frame and an upper cover, wherein an external wall of the main frame includes a recess part combined with the upper cover to form the resonating tube, and a through hole which is formed in the external wall and through which the recess part is connected to the inside of the main frame.

According to aspects of the invention, the disc drive may comprise a plurality of helmholtz resonators that reduce noises of different frequencies.

BRIEF DESCRIPTION OF THE DRAWINGS

The above and other aspects and advantages of the present invention will become more apparent and more readily appreciated by describing in detail embodiments thereof with reference to the accompanying drawings in which.

DETAILED DESCRIPTION OF THE EMBODIMENTS

Figure 1:
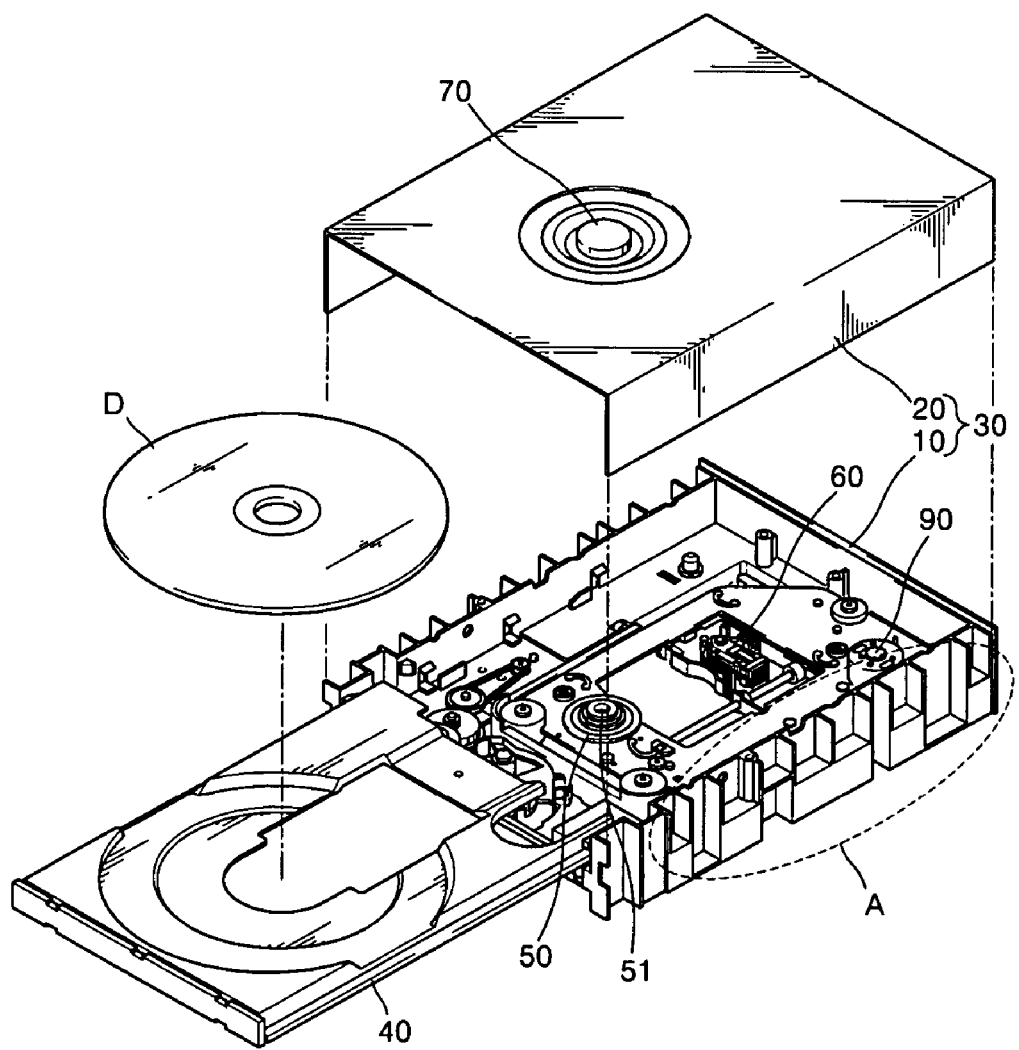
FIG. 1 is an exploded perspective view of a disc drive with a resonator according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

In general, noise caused in a disc drive is resulted from a combination of noise of various frequencies. The sound pressure level (SPL) of noise of a frequency determined by a shape and size of a disc drive is higher than the SPLs of noise of other frequencies. The SPL of noise of a specific frequency may be higher than the SPLs of noise of other frequencies regardless of the shape of the disc drive. Thus, high SPL frequency noise may be selectively removed to effectively noise in the disc drive FIG. 1 is an exploded perspective view of a disc drive according to an embodiment of the present invention. Referring to FIG. 1, a main frame 10 is combined with an upper cover 20, thus forming a frame 30. A tray 40 on which a disc D is loaded is installed to slide into the main frame 10. A spindle motor 50 that rotates the disc D and an optical pickup 60 that slides over the disc D in a radial direction of the disc D are installed in the main frame 10. A turntable 51 is mounted on the spindle motor 50 to support a surface of the disc D. A clamp 70 is installed on the upper cover 20 to support the other surface of the disc D. The clamp 70 rotates while facing the turntable 51, due to magnetic force of a magnet (not shown) installed in the turntable 51. Although not shown in the drawings, the optical pickup 60 includes a laser diode that is a light source, a collimating lens that collimates light emitting from the laser diode, polarizing prisms, mirrors, and an object lens. The optical pickup 60 writes data to or reads data from the disc D by irradiating a laser beam thereon while it slides in the radial direction of the disc D. According to aspects of the invention, it is understood that other types of drives can be used. By way of example, it is understood that the drive need not use the tray 40 and instead receives the disc D during manufacture or using an entry slot and/or a caddy holding the disc D.

When driving the disc drive of FIG. 1, a driving noise is generated by the spindle motor 50 and/or the driving motor 90 driving the optical pickup 60. Also, a friction between an air flow caused by rotation of the disc D and components installed the disc drive, thus bringing out friction noise. In particular, noise of a frequency determined by a shape and size of the disc drive has a very high sound pressure level (SPL).

Figure 2:
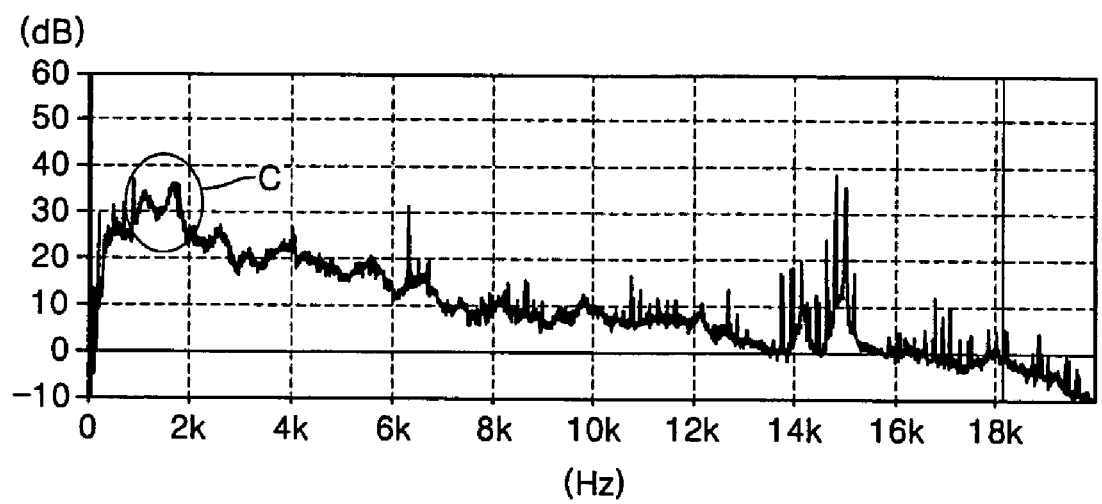
FIG. 2 is a graph illustrating sound pressure levels (SPLs) of noise, which is caused by disc rotation, versus frequencies.

FIG. 2 is a graph illustrating SPLs of noise, which is generated in a disc drive, versus frequencies. Referring to FIG. 2, as noted by reference C, the SPL of noise C at frequencies about 1 KHz and 1.7 KHz is high. The noise may be caused by resonance in the disc drive. In general, noise, the half wavelength of which is equal to the length or width of the inside of the disc drive, resonates in the disc drive and its SPL becomes greater. In general, a disc drive is designed to have a size of about 180 mm×130 mm so that the disc drive can accommodate a disc with a diameter of 120 mm. Assuming the speed of sound is about 340 m/sec, noise at frequencies about 0.9 KHz and 1.3 KHz resonate in the disc drive. However, considering a space occupied by the components in the disc drive and the shape of the disc drive, noise at frequencies about 1 KHz and about 1.7 KHz substantially resonates in the disc drive and have a high SPL as shown in the graph of FIG. 2. Also, it is understandable that a noise of frequency will depend on a disc size as well as the medium (e.g., gas, altitude, temperature) through which the sound travels.

Figure 3:
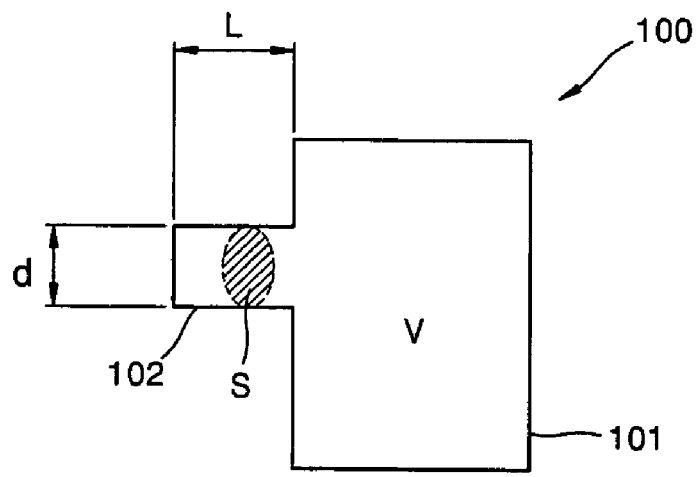
FIG. 3 is a diagram illustrating the operation of a resonator according to an embodiment of the present invention.

A disc drive shown in FIG. 1 according to an embodiment of the present invention further includes a helmhortz resonator 100 as shown in FIG. 3 to reduce noise with a high SPL at a particular frequency. Referring to FIG. 3, the helmholtz resonator 100 includes a resonating tube 101 with a predetermined volume, and a neck 102 that is a path that permits an inflow of air into the resonating tube 101. The air is a medium that delivers a sound wave caused by noise in the shown embodiment. In this embodiment, the helmholtz resonator 100 is formed in the frame 30 of the disc drive of FIG. 1.

Figure 4:
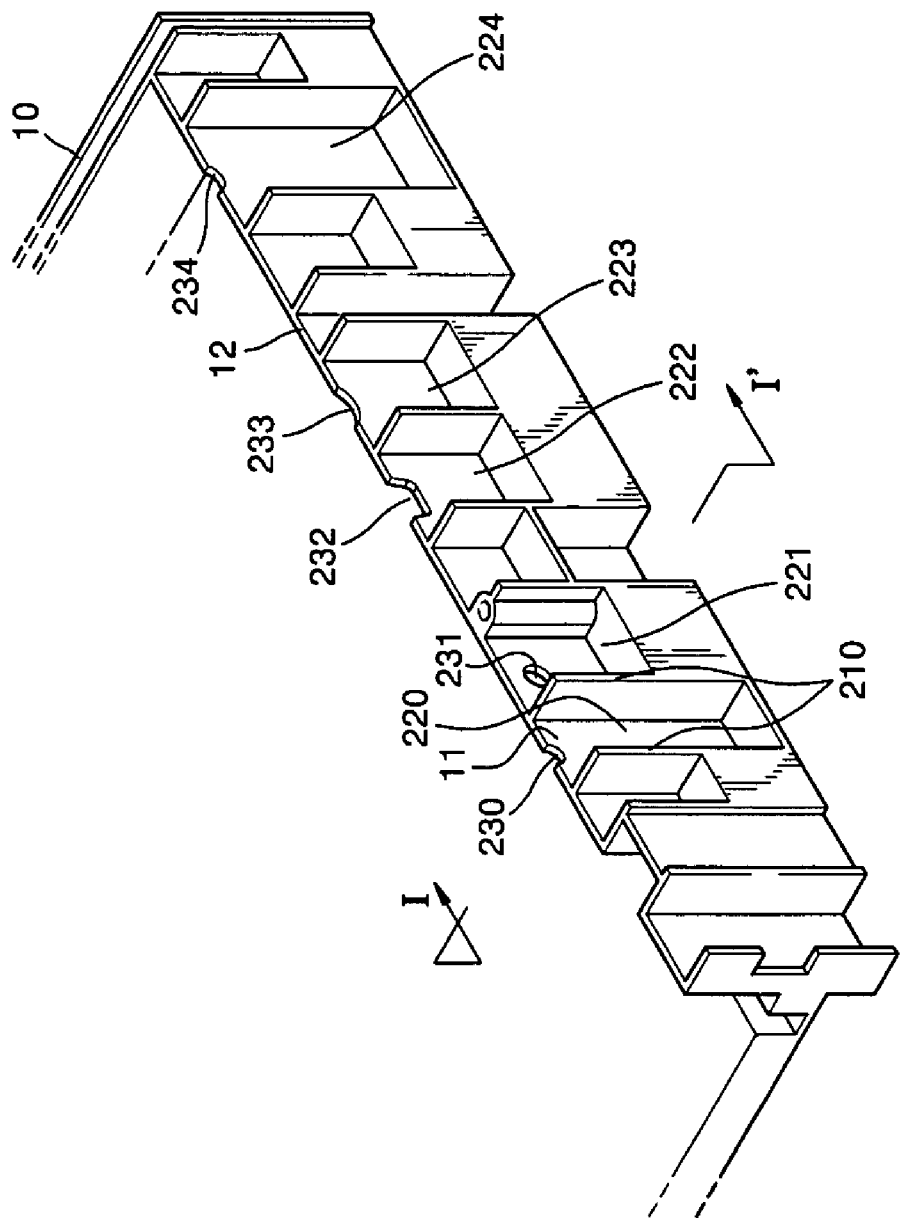
FIG. 4 is a detailed perspective view of a part A of the disc drive of FIG. 1.
Figure 5:
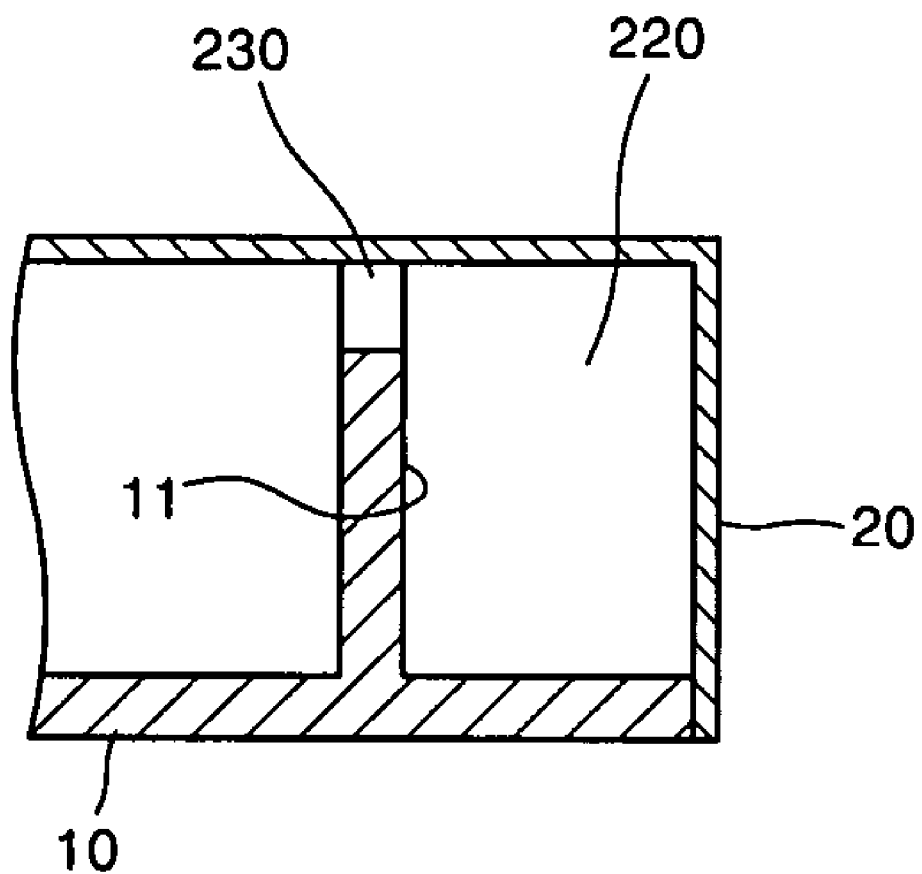
FIG. 5 is a cross-sectional view of the part A of FIG. 4, taken along the lines I-I'.

FIG. 4 is a detailed perspective view of a part A of the disc drive of FIG. 1. FIG. 5 is a cross-sectional view of the part A of FIG. 4, taken along the lines I-I'. Referring to FIG. 4, a pair of ribs 210 project out from a sidewall 11 of the main frame 10. A recess part 220 is defined by the sidewall 11 of the main frame 10 and the pair of ribs 210. A through hole 230 is formed in the sidewall 11 between the pair of ribs 210. The through hole 230 is a path through which a sound wave of noise generated in the main frame 10 is transmitted to the recess part 220. The through hole 230 may be formed by partially cutting an upper portion 12 of the sidewall 11. As such, the helmholtz resonator 100 is formed using the frame 30. However, it is understood that the resonator can be separately formed and installed in the frame 30 according to an aspect of the invention.

The upper cover 20 of the disc drive shown in FIG. 1 may be fabricated by press-processing a metal plate or injection molding a plastic material according to aspects of the invention. Referring to FIG. 5, the upper cover 20 is combined with an upper portion of the main frame 10 to cover external parts of the sidewalls. When the upper cover 20 is combined with the main frame 10, the recess part 220, which is defined by the sidewalls 11 and the pairs of ribs 210 forms the resonating tube 101 with a predetermined volume, and the through hole 230 forms the neck 102 that is semicircular. In general, the pair of ribs 210 are formed to improve the structural strength of the main frame 10 made by injection-molding a plastic material. In the disc drive according to this embodiment of the present invention, the pairs of ribs 210, the recess part 220, and the through hole 230 form the helmholtz resonator 100 without additional components.

However, the shapes of the recess part 220 and the through hole 230 are not limited to the above description. For instance, as shown in FIG. 4, various hollow parts 221, 222, 223, and 224 having rectangular, square, and/or curvilinear may be formed in the main frame 10. Also, a circular through hole 231, which is formed by penetrating through a center part of the sidewall 11, a semi-rectangular through hole 232, and a semi-oval through hole 233 may be formed in the main frame 10. Further, installation of the helmholtz resonator 100 is not limited to the sidewall 11 of the frame 30, that is, it can be installed in any space of the disc drive.

The operation of the helmholtz resonator 100 will now be described.

The helmholtz resonator 100 operates at a resonating frequency calculated by Equation (1):

$$\frac{C}{2\pi}\sqrt{\frac{S}{VL'}}, \qquad (1)$$

wherein C denotes speed of sound, S denotes an area of a cross-section of the neck 102, V denotes volume of the resonating tube 101, and L' denotes an equivalent length to a length L of the neck 102.

The length L' is calculated by Equation (2), using the length L of the neck 102 and an equivalent diameter d of a length of the neck 102. A cross section of the neck 102 may be variously constructed. The equivalent diameter d is obtained where the cross section of the neck 102 is converted into an equivalent circle. The length L of the neck 102 must be shorter than a wavelength of noise that is to be removed.

$$L'=L+0.8d \qquad (2)$$

When a sound wave of noise flows into the helmholtz resonator 100, air that fills the resonating tube 101 acts as a spring of a mechanical vibration system pushing out the sound wave from the resonating tube 101. Then, by the spring action of the air in the resonating tube 101, the air in the neck 102 resonates with a resonating frequency calculated by Equations (1) and (2). That is, the air in the neck 102 acts as mass operating on the mechanical vibration system. The resonating frequency is equivalent to the frequency of the sound wave flowing into the helmhortz resonator 100 via the neck 102, but have phases that are opposite to each other. Accordingly, the incoming sound wave is offset by the resonating wave in the neck 102. Also, intense movement of air molecules around the neck 102 changes the sound energy into thermal energy. Thus, the energy of the resonating wave is changed. If the volume V of the resonating tube 101, the length L and the equivalent diameter d of the neck 102 are determined so that the resonating frequency range can be from 1.7 KHz to 1 KHz, it is possible to reduce high-SPL noise at a frequency about 1.7 KHz and 1 KHz, shown in FIG. 2. That is, as described above, the helmholtz resonator 100 has selective frequency absorption characteristics corresponding to the SPL to be removed.

So far, a method of reducing high SPL noises at a frequency determined by a shape and size of a disc drive, using the helmholtz resonator 100 is described according to an aspect of the invention. However, the present invention is not limited to the above description. An SPL of noise at a particular frequency may not be related to the shape and size of the disc drive, and the helmholtz resonator 100 may be designed to reduce noise at various other frequencies by appropriately determining the volume V of the resonating tube 101 and the length L and the equivalent diameter d of the neck 102.

A disc drive according to the present invention may include a plurality of helmhortz resonators 100 as shown in FIG. 4. The plurality of helmhortz resonators 100 may not only be designed to reduce noises of the same frequencies, but can also be designed to reduce noises of different frequencies. Adjustment of the distance between the pair of the ribs 210 changes the volume of the recess part 220, and a change in the volume of the recess part 220 results in a change in the volume V of the resonating tube 101. Also, adjustment of the shape and size of the through hole 230 changes the diameter d and cross-section area S of the neck 102.

As described above, a disc drive adopting a resonator according to the present invention is capable of selectively removing high SPL noise at a particular frequency, thereby minimizing noise in the disc drive. Also, the resonator is constructed integrally with a frame, thereby reducing noise occurring in the disc drive without adding additional components.

While described in terms of an optical drive, it is understood that aspects of the present invention could be implemented in non-optical drives, such as magnetic and magneto-optical drives, or in any application in which noise from a spinning object is to be removed.

While this invention has been particularly shown and described with reference to exemplary embodiments thereof, it will be understood by those skilled in the art that various changes in form and details may be made therein without departing from the spirit and scope of the invention as defined by the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc drive for use with a disc comprising:
    a spindle motor;
    an optical pickup that accesses the disc rotated by the spindle motor so as to write data to and/or reads data from the disc;
    a frame in which the spindle motor and the optical pickup are to be installed;
    a tray to load the disc, the tray slidably installed in the frame; and
    at least one helmholtz resonator which is installed in the frame to reduce a noise of a particular frequency determined by a volume of a resonating tube and a length and an equivalent diameter of a neck which connects the tube to an inner portion of the frame having the disc.

2. The disc drive of claim 1, wherein the helmholtz resonator is constructed integrally with the frame.

3. The disc drive of claim 2, wherein:
    the frame includes a main frame and an upper cover, and
    an external wall of the main frame includes a recess part combined with the upper cover to form the resonating tube, and a through hole which is formed in the external wall and through which the recess part is connected to an inside of the main frame in which the disc is disposed.

4. The disc drive of claim 1, wherein the at least one helmholtz resonator comprises a plurality of helmholtz resonators that reduce noises of different frequencies.

5. The disc drive of claim 1, wherein the particular frequency reduced by the resonator is:

$$\frac{C}{2\pi}\sqrt{\frac{S}{VL'}}$$

wherein C denotes a speed of sound in the disc drive, S denotes an area of a cross-section of the neck, V denotes a volume of the resonating tube, and L' denotes an equivalent length to a length L of the neck.

6. The disc drive of claim 5, wherein the equivalent length L' of the neck is:

$$L'=L+0.8d$$

wherein d denotes the equivalent diameter of the neck.

7. The disc drive of claim 3, wherein the diameter of the neck is shorter than a wave length of the noise the particular frequency to be reduced.

8. The optical disc drive of claim 1, wherein the helmholtz resonator reducing a noise of the predetermined frequency is about 1 KHz.

9. The optical disc drive of claim 1, wherein the helmholtz resonator reducing a noise of the second predetermined frequency is about 1.7 KHz.

10. The disc drive of claim 2, wherein the at least one helmholtz resonator comprises a plurality of helmholtz resonators that reduce noises of different frequencies.

11. The disc drive of claim 3, wherein the at least one helmholtz resonator comprises a plurality of helmholtz resonators that reduce noises of different frequencies.

12. A housing for use with a disc drive a pickup that accesses a disc rotated by a motor so as to write data to and/or read data from the disc, the housing comprising:
    a frame in which the motor and the pickup are installed; and
    a helmholtz resonator which is installed in the frame to reduce noise of a predetermined frequency, wherein:
    the frame includes a main frame and an upper cover, an external wall of the main frame includes a recess part combined with the upper cover to form a resonating tube of the resonator, and through hole which is formed in the external wall and through which the recess part is connected to inside of the main frame.

13. The disc drive housing of claim 12, further comprises a second helmholtz resonator which is installed in the frame to reduce noise of a second predetermined frequency.

14. The disc drive of claim 12, wherein the predetermined frequency being reduced by the resonator is:

$$\frac{C}{2\pi}\sqrt{\frac{S}{VL'}}$$

wherein C denotes speed of sound, S denotes an area of a cross-section of a neck, V denotes a volume of a resonating tube, and L' denotes an equivalent length to a length L of the neck, and
the resonator comprises the resonating tube and the neck connecting the resonating tube to a position of the frame in which the disc is disposed.

15. The disc drive of claim 14, wherein the equivalent length L of the neck is disposed:

$$L'=L0.8d$$

wherein d denotes an equivalent diameter of the neck.

16. The housing for use with a disc drive of claim 12, further comprising:
    an entry slot defined in the frame, wherein the disc drive receives the disc via the entry slot.

* * * * *

UNITED STATES PATENT AND TRADEMARK OFFICE
CERTIFICATE OF CORRECTION

PATENT NO. : 7,380,252 B2
APPLICATION NO. : 10/897443
DATED : May 27, 2008
INVENTOR(S) : Suk-il Oh et al.

It is certified that error appears in the above-identified patent and that said Letters Patent is hereby corrected as shown below:

Column 5, Line 40 after "with a" change "disc" to --disc,--.

Column 6, Line 60 change "$L' = L0.8d$" to --$L' = L + 0.8d$--.

Signed and Sealed this

Sixteenth Day of September, 2008

JON W. DUDAS
*Director of the United States Patent and Trademark Office*